(12) United States Patent
Maya Agudo et al.

(10) Patent No.: US 10,060,767 B2
(45) Date of Patent: Aug. 28, 2018

(54) ROTARY APPARATUS

(71) Applicant: HEWLETT-PACKARD DEVELOPMENT COMPANY, L.P., Houston, TX (US)

(72) Inventors: Isidoro Maya Agudo, Barcelona (ES); Alberto Borrego Lebrato, Barcelona (ES); Alfons Lobete Camps, Sant Cugat del Valles (ES); David Chanclon, Cornella de Llobregat (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 175 days.

(21) Appl. No.: 15/136,521

(22) Filed: Apr. 22, 2016

(65) Prior Publication Data

US 2017/0307418 A1   Oct. 26, 2017

(51) Int. Cl.
*G01D 5/34*  (2006.01)
*G01D 5/347*  (2006.01)

(52) U.S. Cl.
CPC ....... *G01D 5/3473* (2013.01); *G01D 5/34707* (2013.01)

(58) Field of Classification Search
CPC .......................... G01D 5/3473; G01D 5/34707
See application file for complete search history.

(56) References Cited

U.S. PATENT DOCUMENTS

| | | | |
|---|---|---|---|
| 6,166,374 A | 12/2000 | Snyder | |
| 6,789,876 B2 | 9/2004 | Barclay et al. | |
| 7,205,530 B2 | 4/2007 | Jones | |
| 7,838,815 B2* | 11/2010 | Yamagata | G03G 15/1685 250/231.13 |
| 8,182,059 B2 | 5/2012 | Sakakibara | |
| 8,967,789 B2 | 3/2015 | Mandel et al. | |
| 2015/0187521 A1 | 7/2015 | Chu | |

FOREIGN PATENT DOCUMENTS

| | | |
|---|---|---|
| JP | 2009004209 | 1/2009 |
| KR | 20110040050 | 4/2011 |

* cited by examiner

*Primary Examiner* — Tony Ko
(74) *Attorney, Agent, or Firm* — HP Inc. Patent Department

(57) ABSTRACT

An example apparatus is described which comprises a rotary member supported by a bearing. A rotary encoder is registered with respect to the rotary member to rotate therewith and a sensing arrangement is registered with respect to a surface of the bearing. The sensing arrangement is responsive to rotation of the encoder to generate a signal indicative of a rotational characteristic of the rotary member.

15 Claims, 5 Drawing Sheets

ROTARY APPARATUS

BACKGROUND

Rotary encoders are used to measure rotational characteristic of rotating parts such as motor shafts, rollers, and wheels. Known encoders comprise a passive part comprising recognizable features, such as shapes or patterns, and an active part that is able to sense those features. One of the passive and active parts may be stationary while the other moves with the rotating part such that the encoder may determine, from relative movement of the features of the passive part with respect to the active part, a rotational characteristic of the part. For example, an encoder may determine a degree of rotation or a speed of rotation of a rotating part.

Good alignment between the active and passive parts of the encoder and between the parts of the encoder and the rotating part allow the encoder to accurately determine the rotational characteristic of a rotating part.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1:
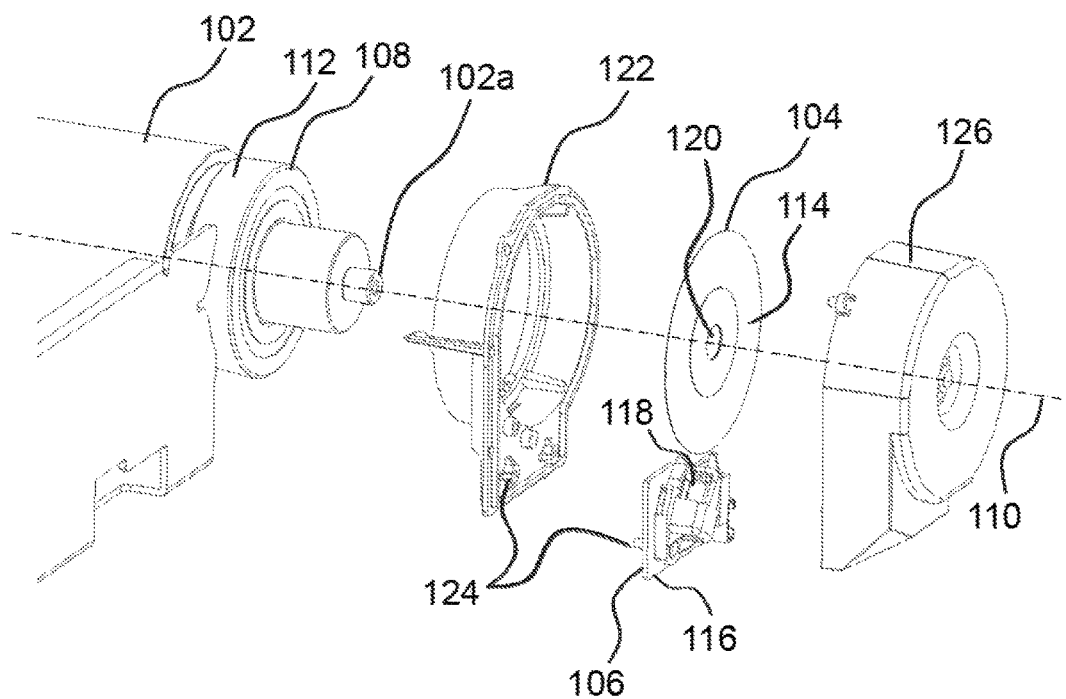
FIG. 1 is a schematic diagram showing an exploded perspective view of an apparatus according to an example.

FIG. 1 illustrates the components of an apparatus 100 according to an example. The apparatus 100 comprises a rotary member 102, a rotary encoder 104, and a sensing arrangement 106.

The rotary member 102 is supported by a bearing 108. The bearing 108 may enable the rotary member 102 to rotate about an axis of rotation 110. The bearing 108 may be, for example, a plain bearing, a rolling-element bearing such as a ball bearing, a fluid bearing, or any other kind of bearing suitable for supporting the rotary member 102. In some examples, the bearing 108 may be fixed such that the outer surface of the bearing 108 does not rotate with respect to the apparatus 100.

The rotary encoder 104 is registered with respect to the rotary member 102. That is, the position of the rotary encoder 104 is caused to correspond with the position of the rotary member 102 such that the rotary encoder 104 and the rotary member 102 rotate about the same axis of rotation 110.

The sensing arrangement 106 is registered with respect to a surface 112 of the bearing 108. That is, the position of the sensing arrangement 106 is caused to correspond with the position of the bearing 108. The sensing arrangement 106 is responsive to rotation of the rotary encoder 104 to generate a signal indicative of a rotational characteristic of the rotary member 102.

The rotary member 102 may be a shaft, roller or wheel. For example, the rotary member 102 may be a roller in a printing apparatus. In some examples, the rotary member 102 may be cylindrical in shape and may be elongate along the axis of rotation 110.

In use the rotary member 102 may be driven to rotate. In some examples, the rotary member 102 may be connected to a drive motor (not shown) to drive rotation of the rotary member 102 about the axis of rotation 110. The drive motor may be connected directly to a drive shaft of the motor, or may be connected via gears, drive belts or any other mechanism. In some examples, the rotary member 102 may not be driven and instead caused to rotate passively. For example, the rotary member 102 may be a roller in a print apparatus that rotates as a print medium (e.g. paper) passes around the roller.

The rotary encoder 104 may be fixed to an end portion 102a of the rotary member 102. For example, the rotary encoder may be a disk that can be fixedly attached to an end of a roller, or to a side of a wheel. For another example, the encoder may be fixed, printed or otherwise marked onto a circumferential surface of the rotary encoder 104.

The rotary encoder 104 comprises recognisable features that the sensing arrangement 106 can use to determine a rotational characteristic of the rotary element 102. For example, the rotary encoder 104 may comprise portions which reflect or transmit relatively more light than other portions of the rotary encoder 104. In some examples, the features may be separated at angular intervals corresponding with a resolution at which the rotational characteristic of the rotary member 102 is to be determined. In some examples, the features may encode information identifying an absolute angular position.

In the example shown in FIG. 1, the rotary encoder 104 is a disk comprising a surface 114 on which the recognisable features are provided. The disk may be glued or otherwise fixedly attached to the end portion 102a of the rotary member 102. The rotary encoder 104 may, for example, be provided with a central hole 120. The diameter of the rotary member 102 may be reduced at the end portion 102a such that the hole 120 is able to receive the reduced diameter end portion 102a.

The sensing arrangement 106 comprises a printed circuit board (PCB) 116 supporting a sensing element, referred to herein as a sensor 118. The PCB may comprise circuitry for processing signals provided by the sensor 118. The circuitry may in some examples determine the rotational characteristic of the rotary element 102 based on signals generated by the sensor 118 and may generate a signal on the basis of the determined rotational characteristic. In other examples, the circuitry may not determine the rotation characteristic itself and may provide a signal indicative of the signal generated by the sensor 118, so that the rotational characteristic may be determined by circuitry or a processor provided elsewhere.

The sensor 118 may be any sensor able to sense the features provided on the rotary encoder 104. For example, the sensor may be an optical sensor such as a photo detector able to detect variations in light intensity.

In the example shown in FIG. 1, the apparatus 100 comprises an encoder support body 122. The encoder support body 122 comprises a first side on which the support body 122 interfaces with the rotary member 102 via the bearing 108, and a second side on which the encoder support body 122 interfaces with the sensing arrangement 106.

The encoder support body 122 and the PCB 116 comprise registration features 124 for registering the PCB 116 with the support body 122. For example, the support body 122 may comprise a hole located at a predetermined position on the support body 122 and the PCB may be provided with a protrusion that can be aligned with and inserted into the hole. In some examples, the support body 122 may be provided with a protrusion that can be aligned with a hole provided in the PCB 116. In some examples, the support body 122 and the PCB 116 may each comprise multiple registration features 124.

In some examples, the PCB 116 may be fixed to the support body 122. For example, the PCB 116 may be screwed to the support body 122.

In the example shown in FIG. 1, the apparatus 100 comprises an encoder cover 126. The encoder cover 126 fits to the encoder support body 122 to enclose the rotary encoder 104 and the sensing arrangement 106. In some examples, a seal may be provided between edges of the encoder cover 126 and the encoder support body 122. This may help to protect the sensing arrangement from ingress of particular contamination.

Figure 2:
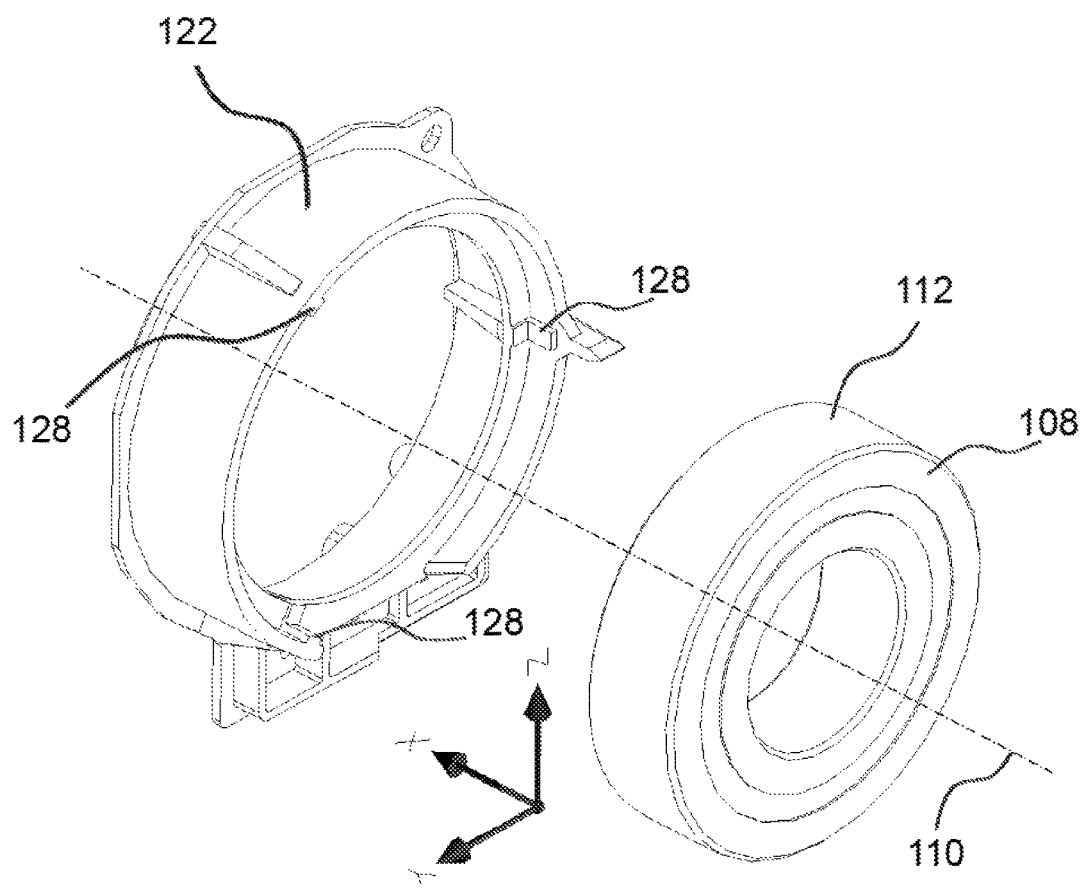
FIG. 2 is a schematic diagram showing an exploded perspective view of a support body and a bearing for an apparatus according to an example.

FIG. 2 shows the encoder support body 122 and the bearing 108 from a reverse viewpoint with respect to that shown in FIG. 1. The encoder support body 122 comprises bearing features for registering the support body 122 with the outer surface 112 of the bearing 108, thereby registering the support body 122 with the rotary member 102. In the example shown in FIG. 2, the support body 122 comprises three registrationbearing surfaces 128. The registration bearing surfaces 128 interface with the outer surface 112 of the bearing 108 to align the support body 122 with the axis of rotation 110 of the rotary member 102 (in directions labelled y and z) and along the axis of rotation 110 of the rotary member 102 (in a direction labelled x). In other examples, the support body 122 may comprise more than three registration bearing surfaces 128. In other examples, the support body 122 may comprise a single continuous registration bearing surface 128 to interface with the outer surface 112 of the bearing 108 around its circumference.

The bearing features of the support body 122 provide a degree of friction between the support body 122 and the outer surface 112 of the bearing 108. In some examples, the friction between the support body 122 and the outer surface 112 of the bearing 108 may prevent rotation of the support body 122 with respect to the bearing 108. This may, for example, help to maintain rotational alignment between the rotary member 102, the rotary encoder 104 and the sensing arrangement 106 along the axis of rotation 110 of the rotary member 102.

In some examples, the bearing features of the support body 122 may be provided with a material with a high coefficient of friction to increase the friction between the support body 122 and the outer surface 112 of the bearing 108. In some examples, the outer surface 112 of the bearing 108 may be provided with a material with a high coefficient of friction to increase the friction between the support body 122 and the outer surface 112 of the bearing 108. This may, for example, help to maintain rotational alignment between the rotary member 102, the rotary encoder 104 and the sensing arrangement 106 along the axis of rotation 110 of the rotary member 102.

Figure 3:
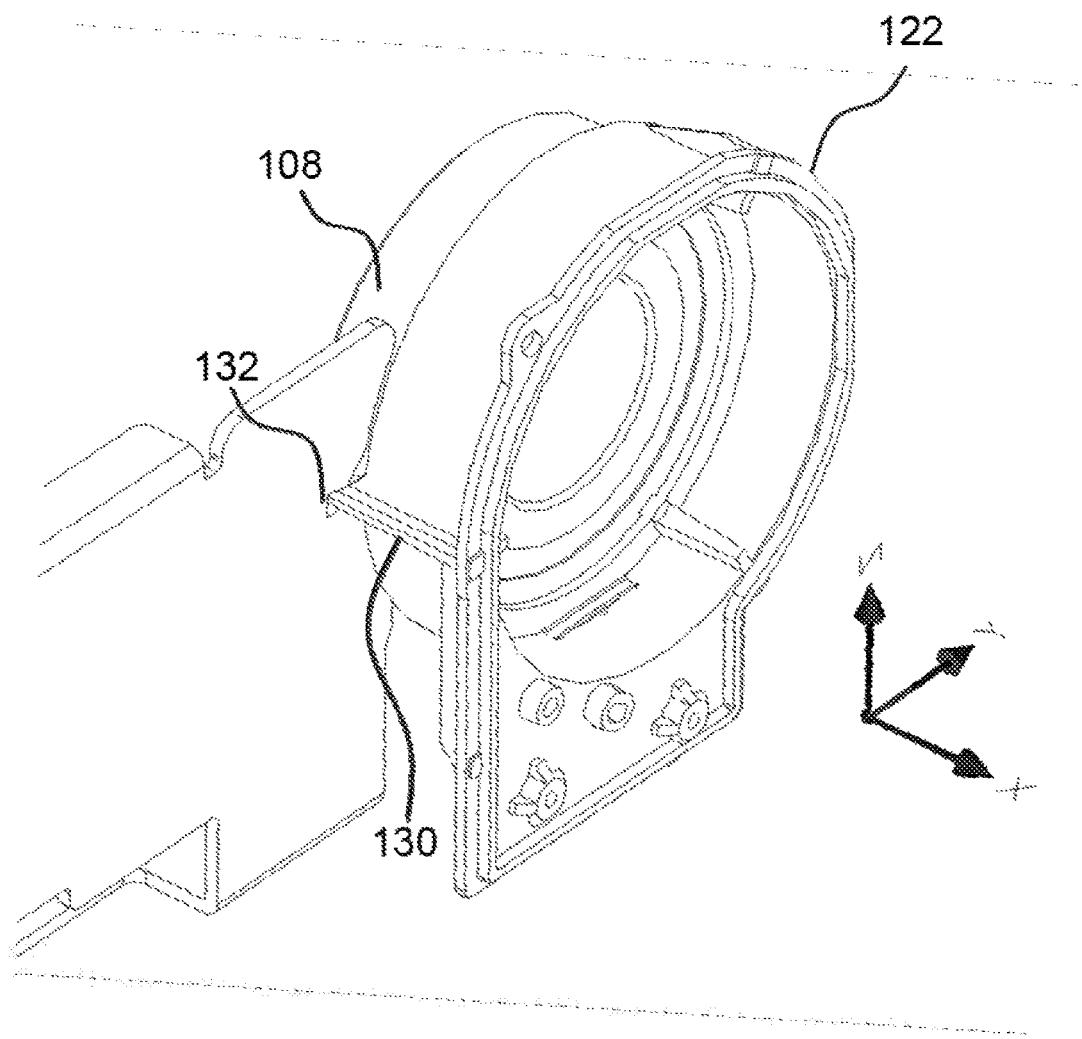
FIG. 3 is a schematic diagram of a support body and a bearing for an apparatus according to an example.

FIG. 3 illustrates the encoder support body 122 installed on the bearing 108. In use, the support body 122 receives the bearing 108 such that the support body 122 is aligned along the axis of rotation 110 of the rotary member 102 (in the direction labelled x).

In some examples, such as the example shown in FIG. 3, the encoder support body 122 comprises an angular locator mechanism comprising a fin 130 protruding from an outer surface of the support body 122. The angular locator mechanism may provide a datum to provide a known angular alignment of the sensing arrangement 106. The fin 130 is to engage with a corresponding receiving slot 132 provided in a static (that is, relative to the rotary element 102) portion of the apparatus 100. When engaged with the receiving slot 132, the fin 130 counteracts torque transferred from the rotary member 102 to the support body 122 via the bearing 108 to help maintain rotational alignment of the support body 122 with respect to the axis of rotation 110 of the rotary member 102 (labelled x). However, because the fin 130 is not rigidly fixed to any fixed point of the apparatus 100, the support body 122 is able to move, and maintain orthogonal alignment with, the axis of rotation 110 of the rotary member 102 in the directions labelled x, y and z. In some examples, the angular locator mechanism may comprise other means to inhibit rotation of the support body 122. For example, the support body 122 may comprise a recess to receive a protruding fixed part of the apparatus 100. In some examples, the support body 122 may comprise multiple fins, multiple recess, or a combination of fins and recesses, to engage with multiple fixed features of the apparatus 100. In some examples, the angular locator mechanism may comprise a fixing, such as a screw, to inhibit rotation of the support body 122.

Figure 4:
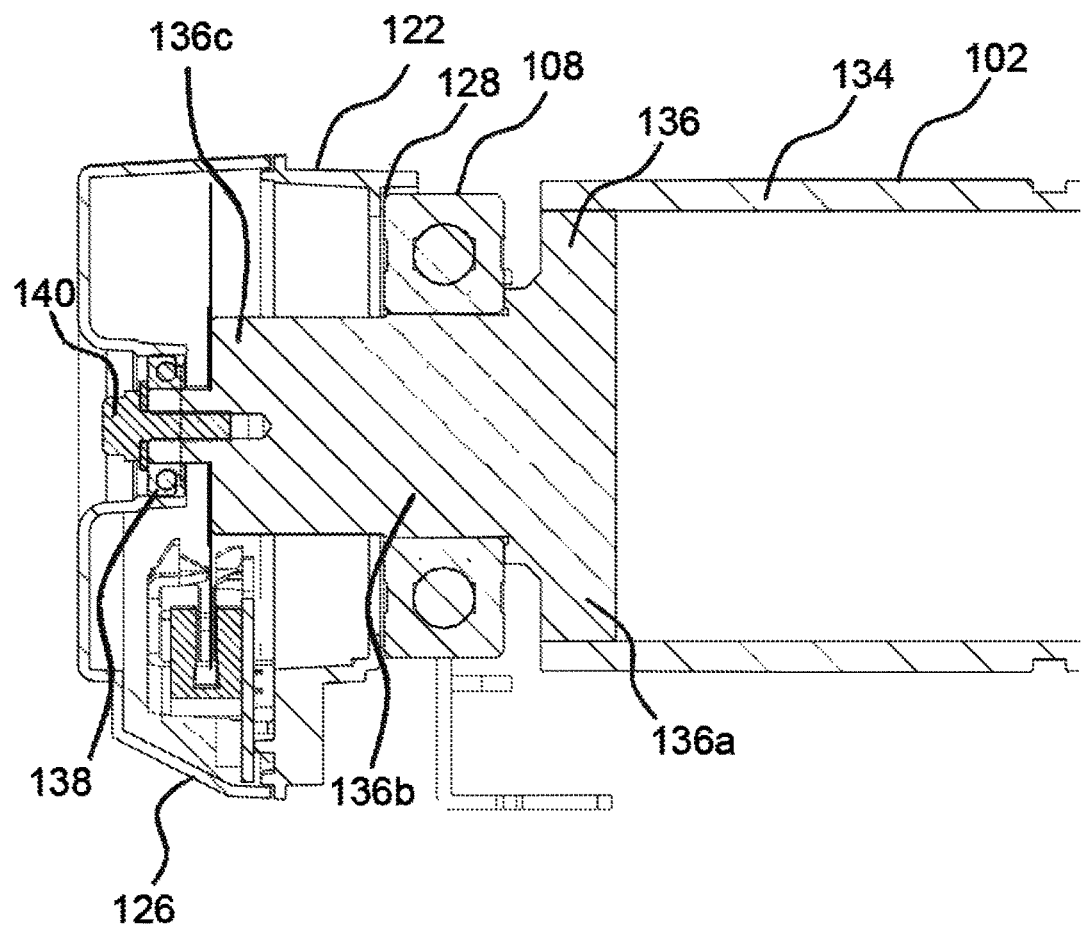
FIG. 4 is a schematic diagram showing a cross-section of an apparatu according to an example.

FIG. 4 is a cross-section view illustrating the apparatus 100 when assembled. In this example, the rotary member 102 comprises a hollow body portion 134 and an end cap 136. The end cap 136 comprises inner portion 136a having an outer diameter sized to fit within the body portion 134. The end cap 136 also comprises a central portion 136b having an outer diameter sized to engage an inner surface of the bearing 108 and an outer portion 136c having an outer diameter sized to fit in the hole 120 provided in the rotary encoder 104. The diameter of the outer portion 136c is less than the diameter of the central portion 136b and the diameter of the central portion 136b is less than the diameter of the inner portion 136a.

To assemble the apparatus 100 shown in FIG. 4, the bearing 108 is fitted over the central portion 136b of the end cap 136. The encoder support body 122 is fitted over the central portion 136b of the end cap 136 and over the bearing 106, aligned such that the registration bearing surfaces 128 engage with the outer surface 112 of the bearing 108 and that the fin 130 is engaged in the recess 132.

The sensing arrangement 106 is fitted to the encoder support body 122 such that the registration features 124 are aligned. For example, the PCB 116 of the sensing arrangement 106 may be screwed to the encoder support body 122 as described above.

The rotary encoder 104 is fitted over the outer portion 136c of the end cap 136. The rotary encoder 104 may be glued or otherwise fixed to the end cap 136 as described above.

The encoder cover 126 is fitted over the sensing arrangement 106 and rotary encoder 104 and fixed in contact with the encoder support body 122. In some examples, a cover hearing 138 is provided between the outer portion 136c of the end cap 136 and the encoder cover 126 to reduce friction on the rotary member 102.

In the example shown in FIG. 4, the encoder cover 126 is urged toward the encoder support body 122 by a bolt 140 screwed into the end cap 136. The bolt 140 acts on the on the cover bearing 138, which in turn acts on the encoder cover 126 to urge the encoder cover 126 toward the encoder support body 122. The force applied by the bolt 140 on the encoder cover 126 is transferred to the encoder support body 122, thereby urging the encoder support body 122 toward the bearing 108. The force provided by the encoder cover 126 thereby helps to maintain the alignment of the rotary member 102, the rotary encoder 104 and the sensing arrangement 106 along the axis of rotation 110 of the rotary member 102. In some examples, the force provided by the encoder cover 126 may act to increase the friction between the support body 122 and the outer surface 112 of the bearing 108. This may, for example, help to maintain rotational alignment between the rotary member 102, the rotary encoder 104 and the sensing arrangement 106 along the axis of rotation 110 of the rotary member 102.

Although in the example described with reference to FIG. 4, the encoder cover 126 is bolted in place, it will be understood that other fixing means could be used. For example, in some examples the encoder cover 126 may be fitted to the end cap 136 by a snap fit mechanism.

The examples described above provide an apparatus with a rotary encoder and sensing arrangement that is self-supporting and in which relative positional accuracy and alignment between parts of the encoder may be maintained with relative ease. In particular, registering both the static and moving parts with respect to the rotary member may, for example, reduce the tolerance chain between the rotary encoder and the sensing arrangement and may thereby improve the accuracy of the encoder. Furthermore, because the rotary encoder and the sensing arrangement are registered with respect to the rotary member, the accuracy of the signal indicative of the rotational characteristic of the rotary member may be maintained despite movement of the rotary member in directions perpendicular to, or along, the axis of rotation of the rotary member. That is, the rotary member may undergo movement other than movement about its axis of rotation without affecting the signal generated by the sensing arrangement.

Furthermore, because the rotary encoder and the sensing arrangement are registered with respect to the rotary member, in service operations in which the rotary member is to be removed, the rotary member, the rotary encoder and the sensing arrangement may be removed together without having to disassemble the rotary encoder and the sensing arrangement and without any loss of alignment. Similarly, the rotary member, the rotary encoder and the sensing arrangement may be installed in the apparatus as a single assembly or may be installed as separate components.

Figure 5:
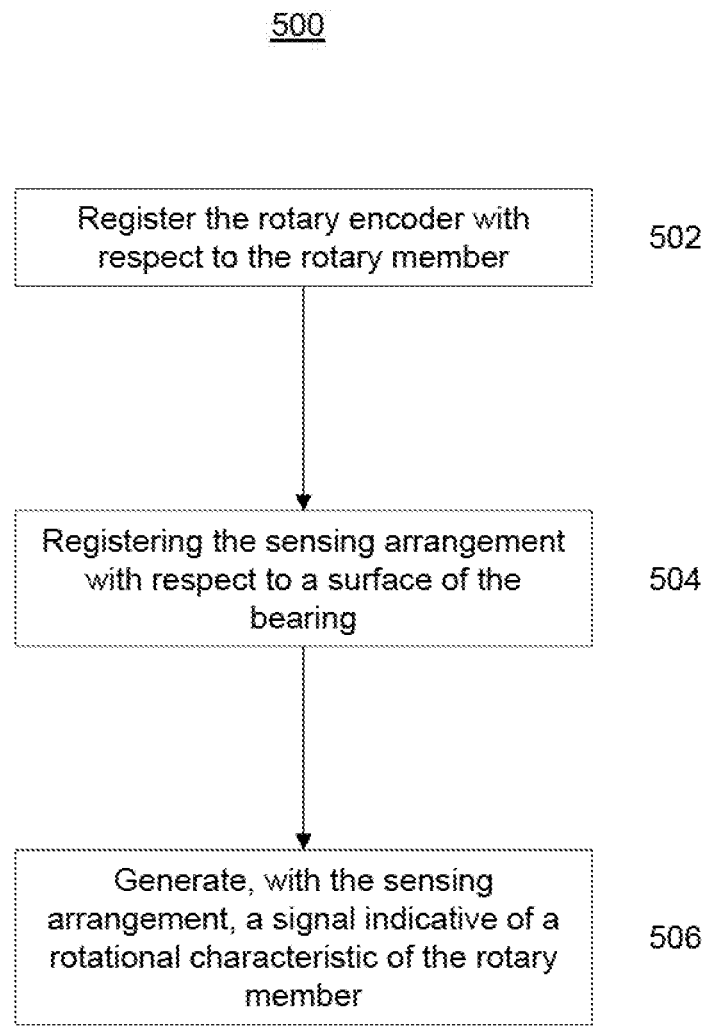
FIG. 5 is a flow diagram illustrating a method of operating an apparatu according to an example.

FIG. 5 is a flow diagram illustrating a method 500 of operating an apparatus, such as the apparatus 100 described above with reference to FIGS. 1 to 4, comprising a rotary member supported by a bearing, a rotary encoder, and a sensing arrangement.

At block 502, the rotary encoder is registered with respect to the rotary member.

At block 504, the sensing arrangement is registered with respect to a surface of the bearing.

At block 504, the sensing arrangement generates a signal indicative o a rotational characteristic of the rotary member.

Any feature described in relation to any one example may be used alone, or in combination with other features described, and may also be used in combination with a feature or features of any other of the examples, or any combination of any other of the examples. Furthermore, equivalents and modifications not described above may also be employed.

What is claimed is:

1. An apparatus comprising:
   a rotary member supported by a bearing;
   a rotary encoder registered with respect to the rotary member to rotate therewith; and
   a sensing arrangement registered with respect to an outside surface of the bearing such that a position of the sensing arrangement is caused to correspond with a position of the bearing and being responsive to rotation of the rotary encoder to generate a signal indicative of a rotational characteristic of the rotary member.

2. The apparatus according to claim 1, comprising a support body mounted on the bearing and supporting the sensing arrangement.

3. The apparatus according to claim 2, wherein the support body comprises a registration bearing to interface with the outside surface of the bearing.

4. The apparatus according to claim 2, wherein the support body comprises a protrusion to engage with a recess provided in a static portion of the apparatus to restrict rotation of the support body about an axis of rotation of the rotary member.

5. The apparatus according to claim 1, wherein the sensing arrangement comprises a sensor in proximity with the rotary encoder.

6. The apparatus according to claim 5, wherein the sensor is an optical sensor to sense features provided on a surface of the rotary encoder.

7. The apparatus according to claim 1, wherein the rotary encoder is an encoder disk.

8. The apparatus according to claim 1, comprising a cover to interface with the support body.

9. The apparatus according to claim 8, wherein the cover comprises a cover bearing to interface with the rotary member.

10. The apparatus according to claim 9, wherein the cover is fixed to an end portion of the rotary member via the cover bearing.

11. An apparatus comprising:
    a rotary member, supported by a bearing, the rotary member being rotatable about an axis of rotation; and
    an encoder assembly comprising:
      a support body having a bearing surface engaged with the bearing;
      a rotary encoder registered with respect to the rotary member; and
      a sensing arrangement, mounted on the support body and registered with respect to an outside surface of the bearing such that a position of the sensing arrangement is caused to correspond with a position of the bearing, to generate a signal indicative of a rotational characteristic of the rotary member about the axis of rotation.

12. The apparatus according to claim 11, wherein the sensing arrangement comprises a circuit board and a sensor.

13. The apparatus according to claim 12, wherein circuit board is provided with alignment features to align the sensing arrangement with corresponding alignment features on the support body.

14. The apparatus according to claim 13, wherein the circuit board comprises circuitry to process a signal provided by the sensor to generate the signal indicative of the rotational characteristic of the rotary member.

15. A method of operating an apparatus comprising a rotary member supported by a bearing, a rotary encoder, and a sensing arrangement, the method comprising:
- registering the rotary encoder with respect to the rotary member;
- registering the sensing arrangement with respect to an outside surface of the bearing such that a position of the sensing arrangement is caused to correspond with a position of the bearing; and
- generating, with the sensing arrangement, a signal indicative of a rotational characteristic of the rotary member.

* * * * *

UNITED STATES PATENT AND TRADEMARK OFFICE
CERTIFICATE OF CORRECTION

PATENT NO. : 10,060,767 B2
APPLICATION NO. : 15/136521
DATED : August 28, 2018
INVENTOR(S) : Isidoro Maya Agudo et al.

It is certified that error appears in the above-identified patent and that said Letters Patent is hereby corrected as shown below:

On the Title Page

In item (56), References Cited, in Column 2, Line 6, delete "Sakakibara" and insert -- Sakakibara et al. --, therefor.

In the Drawings

In sheet 1 of 5, Figure 1, Line 1, above "Figure 1" insert -- 100 --.

Signed and Sealed this
Eleventh Day of December, 2018

Andrei Iancu
*Director of the United States Patent and Trademark Office*